United States Patent
Isobe

(10) Patent No.: US 7,529,910 B2
(45) Date of Patent: May 5, 2009

(54) SERIES AND PARALLEL OPERATION OF RECONFIGURABLE CIRCUITS WITH SELECTION AND TIMING BUFFERS ASSEMBLY FOR PROCESSING AND BINDING DIVIDED DATA PORTIONS IN MATCHED TIMING

(75) Inventor: Takashi Isobe, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/723,333

(22) Filed: Mar. 19, 2007

(65) Prior Publication Data

US 2007/0162727 A1    Jul. 12, 2007

Related U.S. Application Data

(63) Continuation of application No. 11/589,961, filed on Oct. 31, 2006.

(30) Foreign Application Priority Data

Nov. 1, 2005    (JP) .............................. 2005-317872

(51) Int. Cl.
*G06F 15/76* (2006.01)
(52) U.S. Cl. ......................................... 712/37; 713/600
(58) Field of Classification Search ....................... None
See application file for complete search history.

(56) References Cited

U.S. PATENT DOCUMENTS

| 4,609,986 A | 9/1986 | Hartmann et al. |
| 4,642,487 A | 2/1987 | Carter |
| 6,483,875 B1 * | 11/2002 | Hasebe et al. .......... 375/240.15 |
| 2003/0184339 A1 | 10/2003 | Ikeda et al. |
| 2004/0066869 A1 * | 4/2004 | Takiue ........................ 375/354 |

FOREIGN PATENT DOCUMENTS

WO    WO02/95946    5/2002

OTHER PUBLICATIONS

Kai, H. et al., "A Study of Lossless Reconfiguration on Packet Processing System", NTT Network Service Systems Laboratories, pp. 1-7 English Translation, Sep. 23, 2003.

* cited by examiner

*Primary Examiner*—Kenneth S Kim
(74) *Attorney, Agent, or Firm*—Reed Smith LLP; Juan Carlos A. Marquez, Esq.

(57) ABSTRACT

A reconfigurable processor equipped with reconfigurable circuits (RCs) comprises unit A for dividing data input to the processor, and outputting a part of pieces of divided data to a RC, unit B for selecting or binding at least one piece of divided data among divided data which is not outputted from the input data dividing unit and output data of the RC to output processed data to other RCs, at least one RS buffer for temporarily storing data input to unit B to match timings of output from the RC and output from the RS buffer, unit C for binding the output data of the RC, unit A, and unit B to output data from the processor, and at least one RO buffer for temporarily storing data input to unit C to match the timings of output from the RC, output from unit A, and output from unit B.

2 Claims, 13 Drawing Sheets

SERIES AND PARALLEL OPERATION OF RECONFIGURABLE CIRCUITS WITH SELECTION AND TIMING BUFFERS ASSEMBLY FOR PROCESSING AND BINDING DIVIDED DATA PORTIONS IN MATCHED TIMING

CROSS-REFERENCE TO RELATED APPLICATION

This application is a Continuation of U.S. application Ser. No. 11/589,961 filed on Oct. 31, 2006, and claims priority from U.S. application Ser. No. 11/589,961 filed on Oct. 31, 2006, which claims priority from Japanese Patent Application No. 2005-317872, filed on Nov. 1, 2005, the entire disclosure of which is incorporated herein by reference.

BACKGROUND OF THE INVENTION

This invention relates to a reconfigurable processor and a reconfigurable apparatus.

In recent years, a processor has been demanded to have not only performance of computing data being constantly input in real time at a high speed, but also high versatility to facilitate changing of an implemented logic.

For example, in a case of a processor used in a network security field, performance of computing communication data being constantly input in real time at a high speed, and versatility which enables frequent updating of an algorithm for detecting abnormalities of the communication data, or a pattern file have been required.

In a case of a processor used in a video processing field, performance of computing video data constantly input in real time at a high speed, and versatility of performing various processings for the video data by combining a plurality of operations such as encoding/decoding, down-conversion, copyright information addition, division, synthesis, and format conversion have been required.

However, the high versatility to facilitate changing of the implemented logic cannot be obtained by ASIC which includes a dedicated circuit. The high-speed computing processing performance of the real-time data cannot be obtained by a general-purpose processor.

As a processor to simultaneously realize the two performances, a processor called a reconfigurable processor (RP) has been developed and has been attracting attention. This processor is largely classified into three systems, that is, an AND-OR system, a look up table (LUT) system, and an ALU (Arithmetic Logical Unit) system.

The AND-OR system is a system which uses an AND-OR logic array as a logical element. According to this AND-OR system, high density of logics can be achieved because of small logical units (refer to U.S. Pat. No. 4,609,986).

The LUT system is a system which uses a LUT composed of a synchronous random access memory (SRAM) as a logical element. A high-level random logic is realized by prerecording a value of each input signal to the LUT (refer to U.S. Pat. No. 4,642,487).

The ALU system is a system which uses an ALU having functions of computing, retiming, and a memory predesignated as a logical element. It is called a dynamic reconfigurable processor (DRP). This computer system can change an implemented logic by one clock cycle, and has high versatility (refer to WO 02/095946).

The processor of the ALU system includes a reconfigurable circuit composed of a logical element having functions of computing, retiming, memory, and the like, and a bus for enabling free connection among the logical elements, and processes data through a pipeline system according to the connection among the logical elements. Further, an implemented logic of this reconfigurable circuit can be freely reconfigured by changing the connection among the logical elements. Accordingly, the processor of the computer system realizes high-speed processing performance and high versatility.

However, the processor of the ALU system performs data computing through the pipeline system, so when the implemented logic of the reconfigurable circuit is updated, data flowing through the circuit is destroyed, causing a problem of a loss of input data.

Thus, a system that changes the implemented logic of the reconfigurable circuit without losing the input data has been proposed. There have been proposed a system for changing two reconfigurable circuits, that is, currently used and spare reconfigurable circuits by a switch to realize the changing of the implemented logic without any data loss, a system for accumulating input data through an input buffer to change the implemented logic at a point when there is no more data left in the reconfigurable circuit, and the like (refer to "Studies on Uninterruptible Reconfiguration Method in Packet Transfer Processing" by Hidenori Kai and Hiroki Yamada, Society Conference of the Institute of Electronics, Information and Communication Engineers, B-6-150, September 2003).

SUMMARY OF THE INVENTION

However, problems as described below have been inevitable in the conventional DRP and the DRP for switching the currently used and spare circuits.

In a case of the processor for switching the two currently used and spare reconfigurable circuits through the switch to realize changing of the implemented logic without any data loss, a number of necessary reconfigurable circuits is doubled, causing high implementing costs.

In a case of the conventional DRP employing a system for accumulating the input data by the input buffer to change the implemented logic at a point when there is no more data left in the reconfigurable circuit, data inputting and computing processings are stopped while the input data are accumulated in the buffer, causing deterioration of data computing processing performance when the implemented logic is changed.

This invention has been made to solve the above-mentioned problems, and it is an object of this invention to provide a reconfigurable processor and a reconfigurable apparatus capable of realizing logic changing without any loss of input data and without any deterioration of the data computing processing performance.

The reconfigurable processor and apparatus of this invention are each configured as follows to realize the logic changing without any loss of input data and without any deterioration of the data computing processing performance.

According to an aspect of this invention, there is provided a reconfigurable processor/apparatus equipped with at least one reconfigurable computing means capable of implementing optional logics, including: an input data dividing unit for dividing data input to one of the processor and apparatus to generate and output a plurality of pieces of divided data; at least one retiming output buffer for temporarily storing data output from the reconfigurable computing means and the input data dividing unit to output the data by matched timing; an output data binding unit for binding the data read from the retiming output buffer by the matched timing to output the data to an outside of the processor; and means for changing a logic implemented in the reconfigurable computing means within a time period during which computing processing is not executed by the reconfigurable computing means.

Further, according to another aspect of this invention, there is provided a reconfigurable processor/apparatus, including: an input data dividing unit for dividing data to be input to generate a plurality of pieces of divided data, and outputting a part of the plurality of pieces of divided data to one of the reconfigurable computing means; a processed data selection unit for performing one of selecting and binding of at least one piece of data from data output from the input data dividing unit and the reconfigurable computing means to output processed data; at least one retiming selection buffer for temporarily storing data input to the processed data selection unit to output the data by matched timing; an output data binding unit for binding the output data of the reconfigurable computing means, the input data dividing unit, and the processed data selection unit to output the data to an outside of the processor; at least one retiming output buffer for temporarily storing data input to the output data binding unit to output the data by the matched timing; and means for freely interconnecting the reconfigurable computing means in one of series and parallel.

In addition, the reconfigurable processor/apparatus further includes a reconfiguring-of-logic judgment unit in a stage before the input data dividing unit, for permitting logic changing when a format length of the input data exceeds a predesignated value when compared and when there is no data input for a certain period of time.

Further, the reconfigurable processor/apparatus further includes at least one configuration control unit; at least one configuration buffer for each of the configuration control units; and means for permitting the configuration control unit to implement a logic designated by configuration information prestored in the configuration buffer in the reconfigurable computing means.

The reconfigurable processor or apparatus for enabling logic changing without any loss of input data and without any deterioration of data computing processing performance is realized, which is impossible with the conventional reconfigurable processor or apparatus.

According to this invention, the processor or the apparatus is realized by a system of distributing data only necessary for computing among the input data to the reconfigurable computing means, and a system of changing the implemented logic of the reconfigurable computing means by using non-computing time generated in the reconfigurable computing means when data unnecessary for the computing is being input.

DETAILED DESCRIPTION OF THE PREFERRED EMBODIMENTS

First Embodiment

Referring to FIGS. 1 and 3 to 5, an operation of a first embodiment of this invention will be described in detail.

Figure 1:
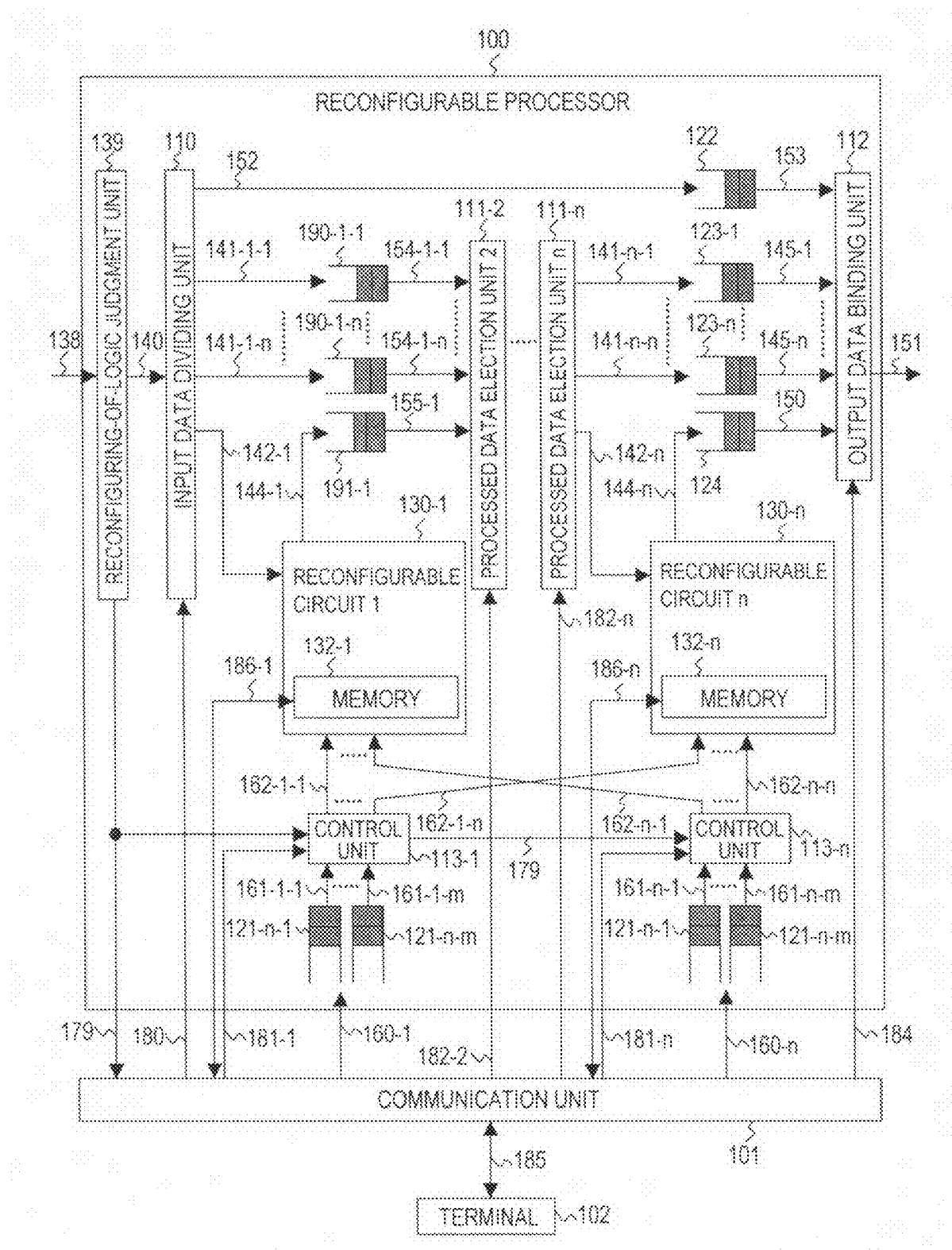
FIG. 1 is a block diagram showing a reconfigurable processor equipped with n reconfigurable circuits according to a first embodiment of this invention.

FIG. 1 is a block diagram showing a reconfigurable processor 100 of this invention. The reconfigurable processor 100 includes a reconfiguring-of-logic judgment unit 139 for comparing a format length of input data 138 with a predesignated value, or data non-input time with a predesignated value, an input data dividing unit 110 for dividing data 140 identical to the input data 138 to output the divided data, a reconfigurable circuit 130-i (i=1 to n) in which an optional logic can be implemented, a processed data selection unit 111-i (i=2 to n) for selecting and synthesizing a plurality of pieces of data being processed to output new data, retiming selection buffers 190-i–j (i=1 to n−1, j=1 to n) and 191-i (i=1 to n−1) for providing predesignated delays to divided data 141-1–i (i=1 to n) output from the input data dividing unit 110, selected data 141-i–j (i=2 to n, j=1 to n) output from the processed data selection unit 111-i, or computing result data 144-i (i=1 to n−1) output from the reconfigurable circuit 130-i to output the data to the processed data selection unit 111-i, an output data binding unit 112 for synthesizing the processed data to output final data 151 to the outside of the processor, retiming output buffers 123-i (i=1 to n), 122, and 124 for outputting divided data 152 output from the input data dividing unit 110, selected data 141-n–j (=1 to n) output from the processed data selection unit n 111-n, or computing result data 144-n output from the reconfigurable circuit 130-n to the output data binding unit by matched timing, a configuration control unit 113-i (i=1 to n) for rewriting an implemented logic of each reconfigurable circuit 130-i, and a configuration buffer 121-i-k (i=1 to n, k=1 to m) for storing configuration information designating an implemented logic.

Figure 3:
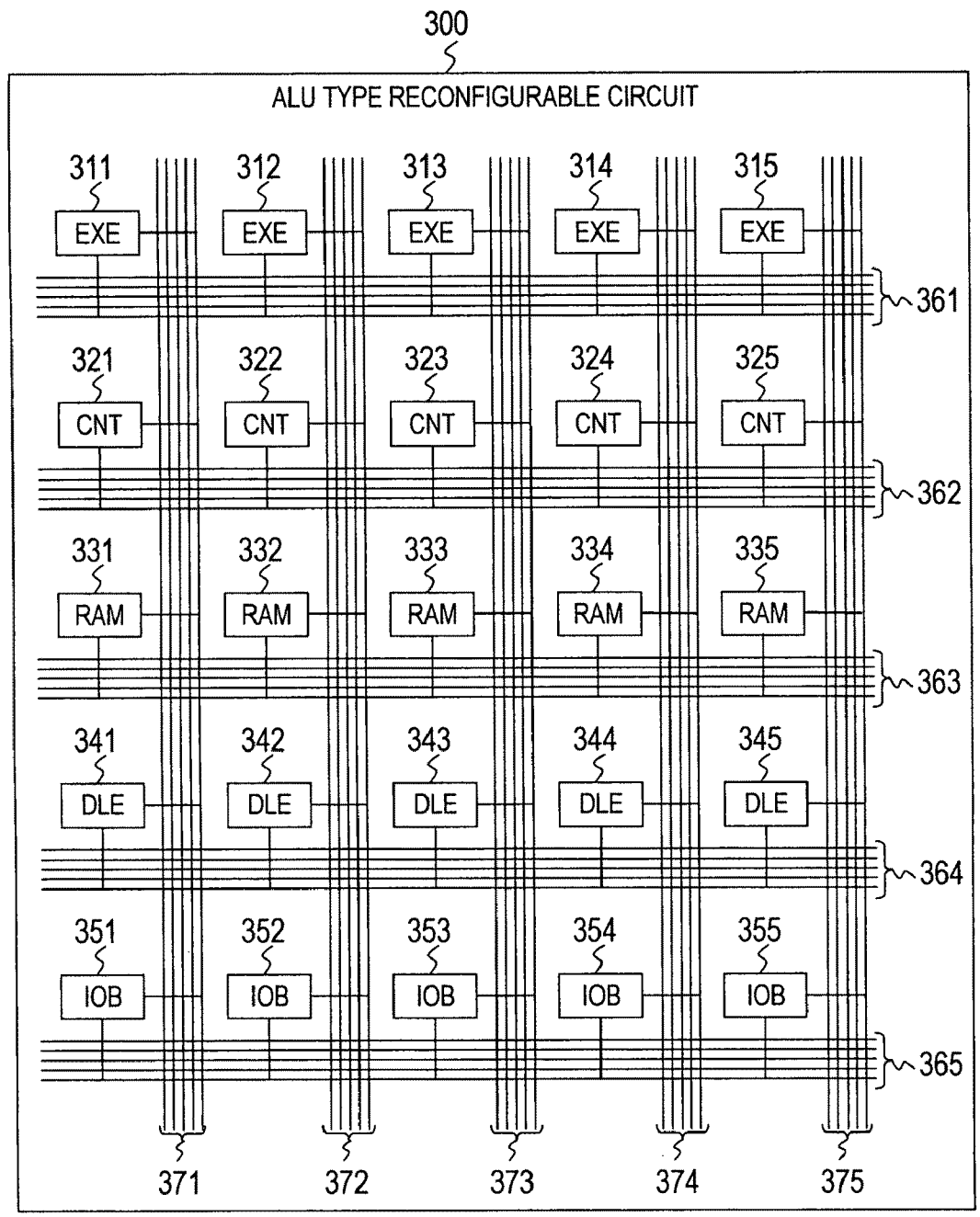
FIG. 3 is a block diagram showing an example of an ALU type reconfigurable circuit according to the first embodiment of this invention.
Figure 4:
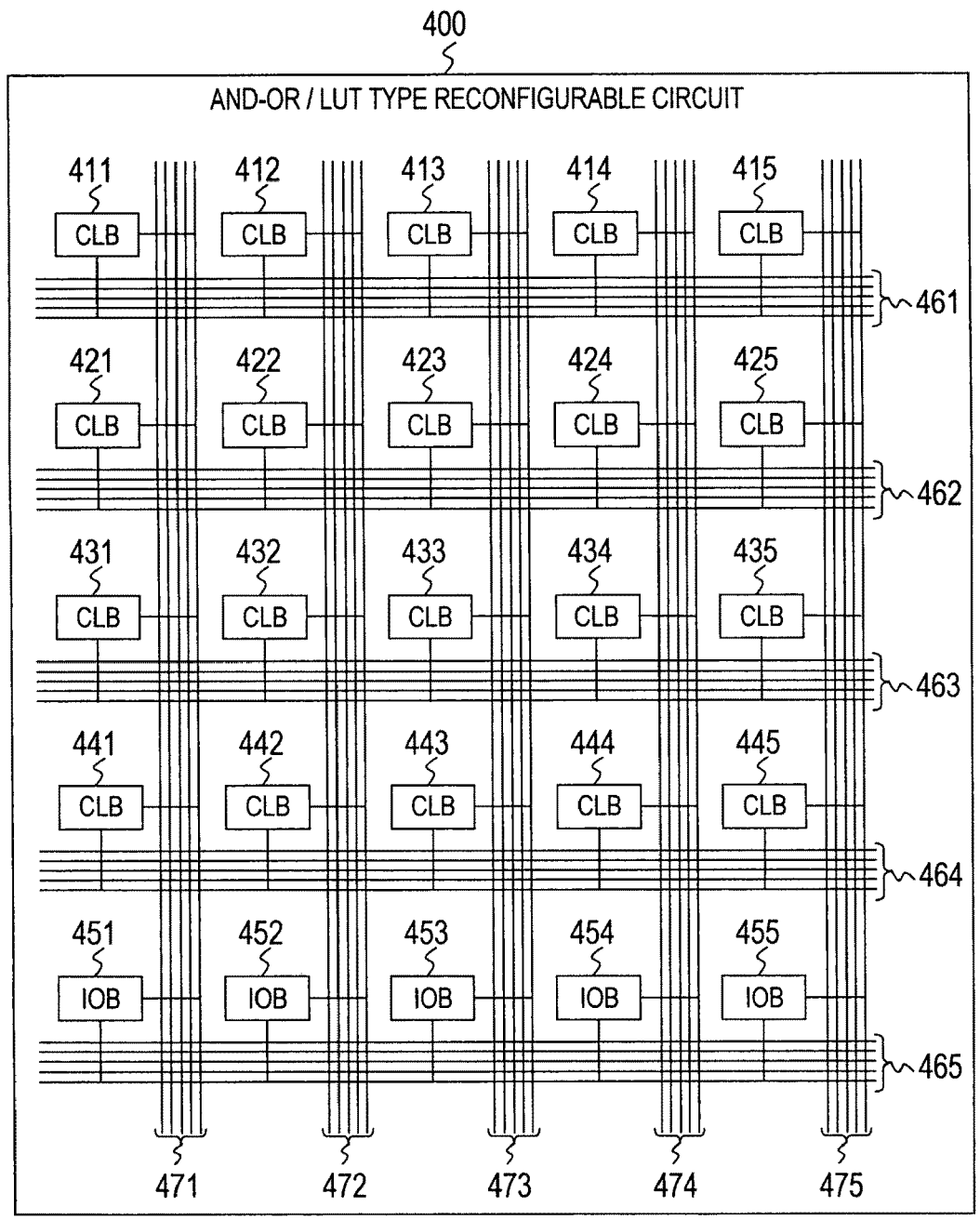
FIG. 4 is a block diagram showing an example of an AND-OR/LUT type reconfigurable circuit according to the first embodiment of this invention.
Figure 5:
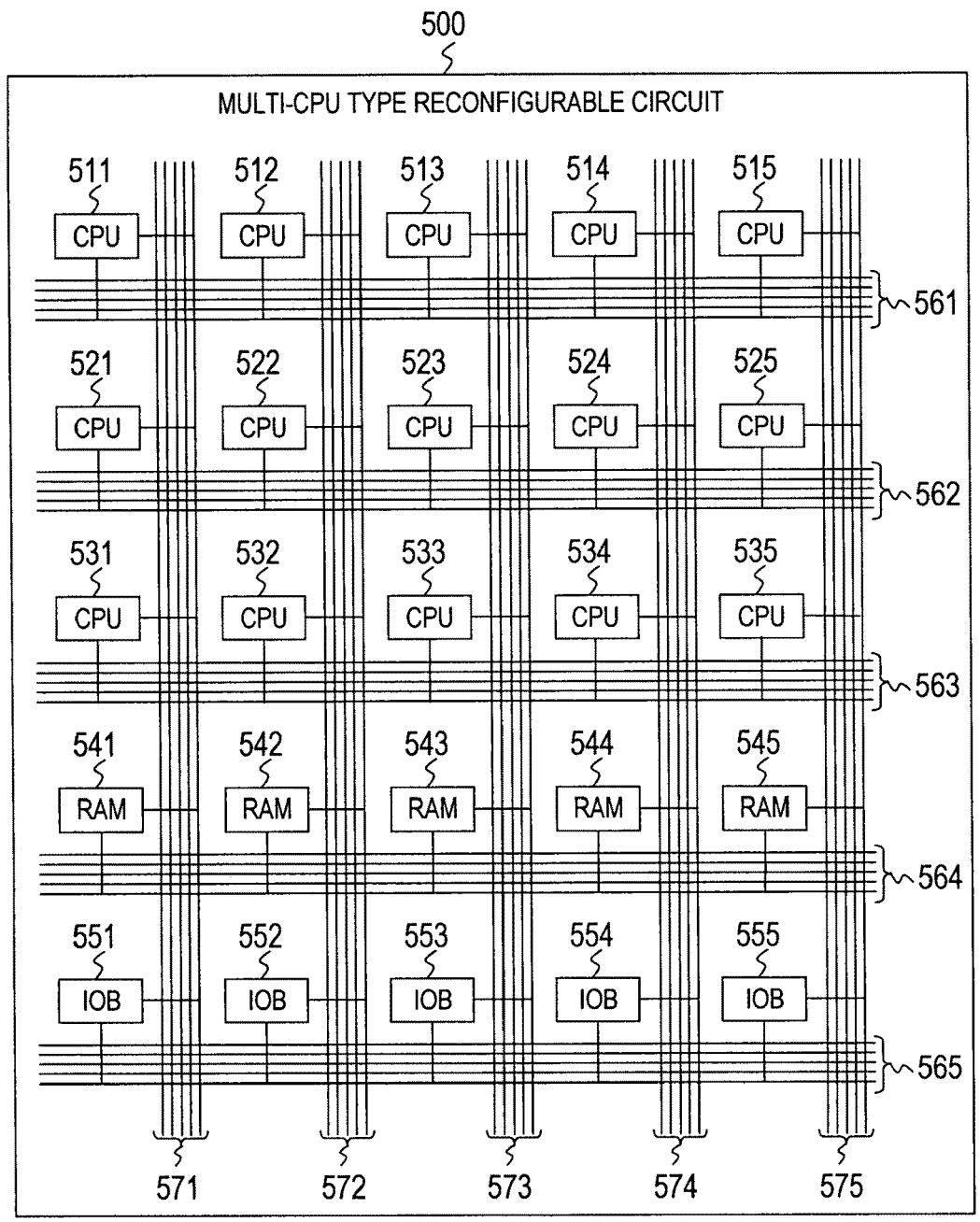
FIG. 5 is a block diagram showing an example of a multi-CPU type reconfigurable circuit according to the first embodiment of this invention.

FIGS. 3 to 5 are exemplary block diagrams of the reconfigurable circuits. FIG. 3 shows an example of a ALU type reconfigurable circuit 300, FIG. 4 shows an example of an AND-OR/LUT type reconfigurable circuit 400, and FIG. 5 shows an example of a multi-CPU type reconfigurable circuit 500.

Next, FIGS. 1 and 3 to 5 will be described in detail.

The reconfigurable processor 100 of FIG. 1 receives the data 138 continuously flowing in from the outside of the processor to execute various processing operations therein, and outputs a processing result as final data 151 to the outside of the processor.

The reconfiguring-of-logic judgment unit 139 receives the data 138 input by a certain format from the outside of the processor to judge whether a format length is larger than a predesignated value. When the format length is larger, the reconfiguring-of-logic judgment unit 139 transmits a command 179 for permitting changing of an implemented logic of the reconfigurable circuit. Alternatively, the reconfiguring-of-logic judgment unit 139 transmits the command 179 for permitting changing of the implemented logic of the reconfigurable circuit when data non-input time exceeds a predetermined period of time. The input data 138 is output as data 140 after a predesignated delay is generated.

The input data dividing unit 110 divides the input data 140. There are three types of divided data, i.e., divided data 142-1 output to the reconfigurable circuit i 130-1, divided data 141-1-i (i=1 to n) output to the processed data selection unit 111-2, and divided data 152 output to the output data binding unit 112. Dividing timing is designated by a preset bit pattern, and a dividing range is set within a preset bit range and a preset clock range. For example, when real-time data 140 is input to the reconfigurable processor 100 by 35 bits per clock, dividing timing is designated to be a 7-th clock from when a bit pattern of higher order of 33 to 35 bits of the input data becomes "101", and a dividing range is designated to be 3 clocks of lower order of 1 to 32 bits of the input data.

The reconfigurable circuit i 130-i (i=1 to n) processes data 142-i (i=1 to n) input from the outside of the circuit according to a pre-implemented logic, and outputs a processing result as computing result data 144-i (i=1 to n) to the outside of the circuit. As shown in FIGS. 3 to 5, the inside of the circuit has a structure in which a plurality of functional blocks are interconnected through a plurality of buses.

The ALU type reconfigurable circuit 300 of FIG. 3 includes ALU type functional blocks. Each functional block has a relatively large bit input/output such as 8, 16, or 32 bits, and includes EXE blocks 311 to 315 for performing predesignated arithmetic operations, CNT blocks 321 to 325 each having a counter function, RAM blocks 331 to 335 for performing data storage, DLE blocks 341 to 345 for delaying input data by designated clocks to output the data, IOB blocks 351 to 355 for inputting/outputting data with respect to the outside of the circuit, and the like. Outputs and inputs of the functional blocks can be freely connected by cross bar type switches 361 to 365 and 371 to 375.

The AND-OR/LUT type reconfigurable circuit 400 of FIG. 4 includes AND-OR/LUT type functional blocks. Each functional block has a relatively small bit input/output such as 1, 2, or 4 bits, and includes CLB blocks 411 to 415, 421 to 425, 431 to 435, and 441 to 445 for outputting predesignated bit patterns according to input bit patterns, 10B blocks 451 to 455 for inputting/outputting data with respect to the outside of the circuit, and the like. Outputs and inputs of the functional blocks can be freely connected through cross bar type switches 461 to 465 and 471 to 475.

The multi-CPU type reconfigurable circuit 500 of FIG. 5 includes CPU type functional blocks. Each functional block has a relatively large bit input/output such as 8, 16, or 32 bits, and includes CPU blocks 511 to 515, 521 to 525, and 531 to 535 for performing various arithmetic operations according to predesignated commands, RAM blocks 531 to 535 for storing data, IOB blocks 551 to 555 for inputting/outputting data with respect to the outside of the circuit, and the like. Outputs and inputs of the functional blocks can be freely connected through cross bar type switches 561 to 565 and 571 to 575.

The processed data selection unit i 111-i (i=2 to n) selects one or more pieces of preset data from a plurality of pieces of data 154-i-j (i=1 to n−1, j=1 to n), 155-i (i=1 to n−1) read from the retiming selection buffers by matched timing, and binds a preset bit range and a preset clock range of the plurality of pieces of selected data in the timing of a preset bit pattern to output the selected data to the outside of the processor. There are two types of selected data to be output, i.e., selected data 142-i (i=2 to n) output to the reconfigurable circuit i 130-i (i=1 to n), and selected data 141-i-j (i=2 to n, j=1 to n) output to the others. The input data 155-i is directly output as selected data 141−(i+1)-i.

The retiming selection buffer 190-i-j (i=1 to n−1, j=1 to n) stores the divided data 141-i-j (1=1 to n) from the input data dividing unit 110 or the selected data 141-i-j (i=2 to n−1, j=1 to n) from the processed data selection unit i 111-i (i=2 to n−1). The retiming selection buffer 191-i (i=1 to n−1) stores the computing result data 144-i (i=1 to n−1) from the reconfigurable circuit i 130-i (i=1 to n−1). The stored data are read after timings are matched by the processed data selection unit i 111-i (i=2 to n).

The output data binding unit 112 selects one or more pieces of preset data from the plurality of pieces of data 153, 145-i (i=1 to n), and 150 read from the retiming output buffer by the matched timing, and binds a preset bit range and a preset clock range of the plurality of pieces of selected data by the timing of a preset bit pattern to output final data 151 to the outside of the processor.

The retiming output buffer 122 stores the divided data 152 from the input data dividing unit 110. The output buffer 124 stores computing result data 144-n from the reconfigurable circuit n 130-n. The retiming output buffer 123-i (i=1 to n) stores the selected data 141-n-j (=1 to n) from the processed data selection unit n 111-n. The stored data are read after timings are matched by the output data binding unit 112.

Upon reception of a configuration change command 181-i (i=1 to n) containing a reconfigurable circuit number and a configuration information number from the communication unit 101 outside the processor, the configuration control unit 113-i (i=1 to n) reads configuration information 161-i-j (i=1 to n, j=1 to m) matched with the configuration information number in the configuration change command 181-i (i=1 to n) from the configuration buffer 121-i-j (i=1 to n, j=1 to m) disposed in each configuration control unit 113-i, and sends a rewrite command 162-i-j (i=1 to n, j=1 to m) of an implemented logic designated by configuration information 161-i-j to the reconfigurable circuit i 130-i (i=1 to n) matched with the reconfigurable circuit number. The reconfigurable circuit i 130-i rewrites the implemented logic according to the rewrite command 162-i-j.

The configuration change command 181-i (i=1 to n) may contain the number of writable clocks. In this case, the configuration control unit 113-i (i=1 to n) outputs the rewrite command 162-i–j of the implemented logic after a passage of the number of writable clocks after reception of the command 179 to permit changing of the implemented logic of the reconfiguring-of-logic judgment unit 139.

The reconfigurable processor 100 sets information 180 on dividing timing and a dividing range received from the communication unit 101 outside the processor in the input data dividing unit 110, sets information 184 on selected data, binding timing, and a binding range received from the communication unit 101 outside the processor in the output data binding unit 112, sets information 182-i (i=2 to n) on selected data, binding timing, and a binding range received from the communication unit 101 outside the processor in the processed data selection unit 111-i (i=2 to n), and sets information 179 on designated format length and data non-input continuance time received from the communication unit 101 outside the processor in the reconfiguring-of-logic judgment unit 139.

The reconfigurable processor 100 stores the configuration information 160-i (i=1 to n) received from the communication unit 101 outside the processor in the configuration buffer 121-i–j.

In the memory 132-i (i=1 to n) incorporated in the reconfigurable circuit i 130-i of the reconfigurable processor 100, direct reading/writing is executed with respect to the communication unit 101 outside the processor. During reading, a read command 186-i (i=1 to n) containing an address number is transmitted from the communication unit 101 to the memory, and read data 186-i is returned from the memory 132-i. During writing, a write command 186-i containing an address number and write data is transmitted from the communication unit 101 to the memory.

Information transfer between the communication unit 101 and the reconfigurable processor 100 is carried out according to a command 185 from the terminal 102 to the communication unit 101.

The reconfigurable processor 100 includes the reconfigurable circuits i 130-i (i=1 to n), the input data dividing unit 110, the retiming output buffers 123-i, 122, and 124, and the output data binding unit 112. Accordingly, by distributing only the data necessary for computing among the input data to the reconfigurable circuit while not distributing the data when data unnecessary for computing is being input, the means for changing the implemented logic of the reconfigurable circuit is realized by using the non-computing time generated in the reconfigurable circuit. Hence, it is possible to realize the reconfigurable processor for enabling logic changing without any loss of input data and without any deterioration of data computing processing performance, which is impossible with the conventional reconfigurable processor or apparatus.

The reconfigurable processor 100 includes the processed data selection unit i 111-i and the retiming selection buffers 190-i–j and 191-i. Hence, the plurality of reconfigurable circuits can be connected in series or in parallel.

The reconfigurable processor 100 includes the configuration control unit 113-i (i=1 to n) as described above and the configuration buffer 121-i–j (i=to n, j=1 to m). Hence, it is possible to implement a logic designated by configuration information prestored in the configuration buffer in each configurable circuit.

Further, the reconfigurable processor 100 includes the memory 132-i (i=1 to n) described above. Hence, it is possible to directly read/write data with respect to the memory within the processor from the outside of the processor.

Second Embodiment

Figure 2:
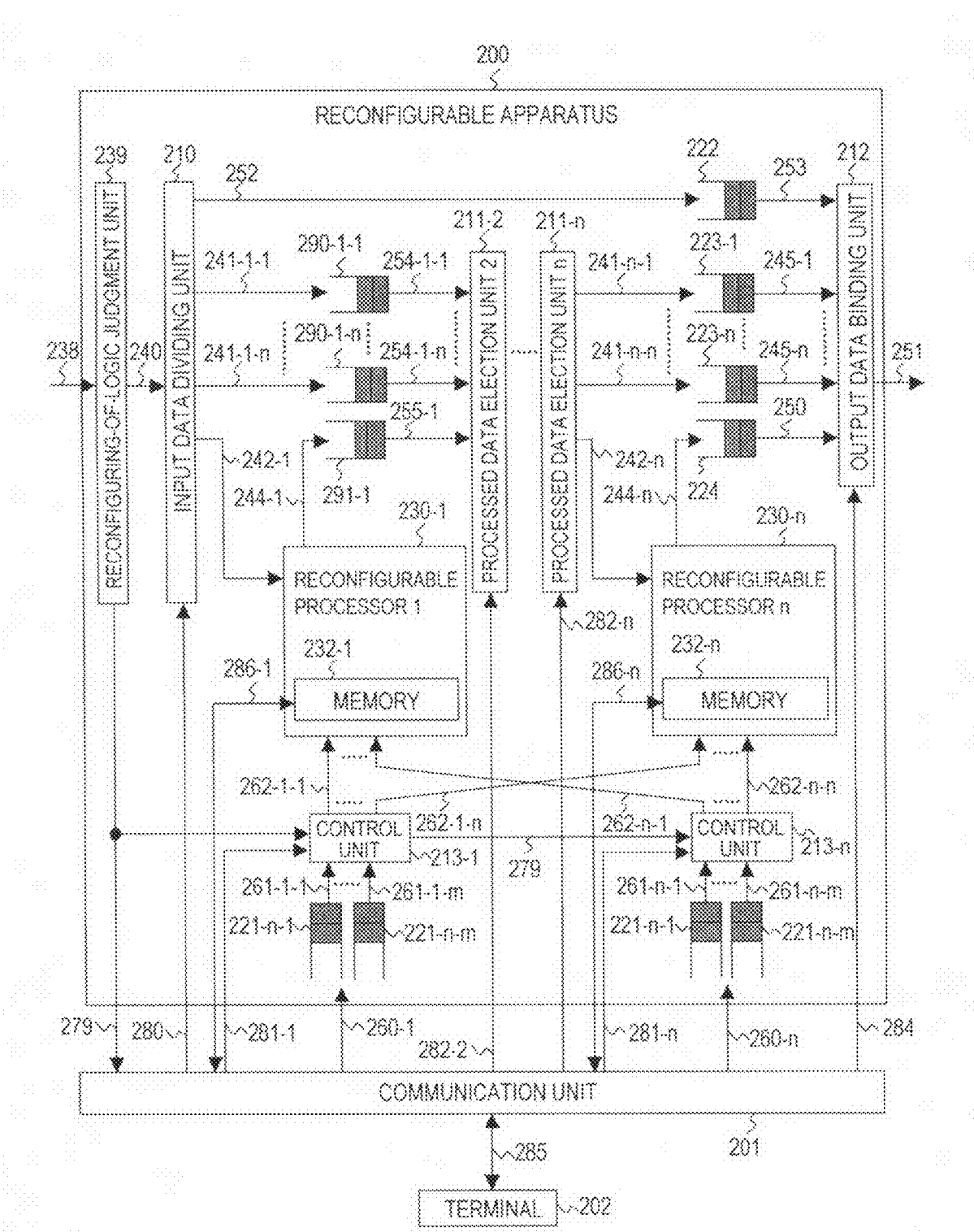
FIG. 2 is a block diagram showing a reconfigurable apparatus equipped with n reconfigurable processors according to a second embodiment of this invention.

Referring to FIG. 2, an operation of this invention will be described in detail.

FIG. 2 is a block diagram showing a reconfigurable apparatus 200 of this invention. The reconfigurable apparatus 200 includes a reconfiguring-of-logic judgment unit 239 for comparing a format length of input data 238 with a predesignated value or data non-input time with a predesignated value, an input data dividing unit 210 for dividing data 240 identical to the input data 238 to output the divided data, a reconfigurable processor 230-i (i=1 to n) in which an optional logic can be implemented, a processed data selection unit 211-i (i=2 to n) for selecting and synthesizing a plurality of pieces of data being processed to output new data, retiming selection buffers 290-i–j (i=1 to n−1, j=1 to n) and 291-i (i=1 to n−1) for providing predesignated delays to divided data 241-1-i (i=1 to n) output from the input data dividing unit 210, selected data 241-i–j (i=2 to n, j=1 to n) output from the processed data selection unit 211-i, or computing result data 244-i (i=1 to n−1) output from the reconfigurable processor 230-i to output the data to the processed data selection unit 211-i, an output data binding unit 212 for synthesizing the processed data to output final data 251 to the outside of the apparatus, retiming output buffers 223-i (i=1 to n), 222, and 224 for outputting divided data 252 output from the input data dividing unit 210, selected data 241-n–j (=1 to n) output from the processed data selection unit n 211-n, or computing result data 244-n output from the reconfigurable processor 230-n to the output data binding unit by matched timing, a configuration control unit 213-i (i=1 to n) for rewriting an implemented logic of each reconfigurable processor 230-i, and a configuration buffer 221-i–k (i=1 to n, k=1 to m) for storing configuration information designating an implemented logic.

Next, FIG. 2 will be described in detail.

The reconfigurable apparatus 200 of FIG. 2 receives the data 238 continuously flowing in from the outside of the apparatus to execute various processing operations therein, and outputs a processing result as final data 251 to the outside of the apparatus.

The reconfiguring-of-logic judgment unit 239 receives the data 238 input by a certain format from the outside of the apparatus to judge whether a format length is larger than a predesignated value. When the format length is larger, the reconfiguring-of-logic judgment unit 239 transmits a command 279 for permitting changing of an implemented logic of the reconfigurable processor. Alternatively, the reconfiguring-of-logic judgment unit 239 transmits the command 279 for permitting changing of the implemented logic of the reconfigurable circuit when data non-input time exceeds a predetermined period of time. The input data 238 is output as data 240 after a predesignated delay is generated.

The input data dividing unit 210 divides the input data 240. There are three types of divided data, i.e., divided data 242-1 output to the reconfigurable processor 1 230-1, divided data 241-1-i (i=1 to n) output to the processed data selection unit 211-2, and divided data 252 output to the output data binding unit 212. Dividing timing is designated by a preset bit pattern, and a dividing range is set within a preset bit range and a preset clock range. For example, when real-time data 240 is input to the reconfigurable apparatus 200 by 35 bits per clock, dividing timing is designated to be a 7-th clock from when a bit pattern of higher order of 33 to 35 bits of the input data becomes "101", and a dividing range is designated to be 3 clocks of lower order of 1 to 32 bits of the input data.

The reconfigurable processor i 230-i (i=1 to n) processes data 242-i (i=1 to n) input from the outside of the processor according to a pre-implemented logic, and outputs a processing result as computing result data 244-i (i=1 to n) to the outside of the processor.

The processed data selection unit i 211-i (i=2 to n) selects one or more pieces of preset data from a plurality of pieces of data 254-i-j (i=1 to n-1, j=1 to n) and 255-i (i=1 to n-1) read from the retiming selection buffers by matched timing, and binds a preset bit range and a preset clock range of the plurality of pieces of selected data by timing of a preset bit pattern to output the selected data to the outside of the apparatus. There are two types of selected data to be output, i.e., selected data 242-i (i=2 to n) output to the reconfigurable processor i 230-i (i=2 to n), and selected data 241-i-j (i=2 to n, j=1 to n) output to the others. The input data 255-i is directly output as selected data 241-(i+1)-i.

The retiming selection buffer 290-i-j (i=1 to n-1, j=1 to n) stores the divided data 24-1-j (=1 to n) from the input data dividing unit 210 or the selected data 241-i-j (i=2 to n-1, j=1 to n) from the processed data selection unit i 211-i (i=2 to n-1). The retiming selection buffer 291-i (i=1 to n-1) stores the computing result data 244-i (i=1 to n-1) from the reconfigurable processor i 230-i (i=1 to n-1). The stored data are read after timings are matched by the processed data selection unit i 211-i (i=2 to n).

The output data binding unit 212 selects one or more pieces of preset data from the plurality of pieces of data 253, 245-i (i=1 to n), and 250 read from the retiming output buffer by the matched timing, and binds a preset bit range and a preset clock range of the plurality of pieces of selected data by the timing of a preset bit pattern to output final data 251 to the outside of the apparatus.

The retiming output buffer 222 stores the divided data 252 from the input data dividing unit 210. The output buffer 224 stores computing result data 244-n from the reconfigurable processor n 230-n. The retiming output buffer 223-i (i=1 to n) stores the selected data 241-n-j (j=1 to n) from the processed data selection unit n 211-n. The stored data are read after timings are matched by the output data binding unit 212.

Upon reception of a configuration change command 281-i (i=1 to n) containing a reconfigurable processor number and a configuration information number from a communication unit 201 outside the apparatus, the configuration control unit 213-i (i=1 to n) reads configuration information 261-i-j (i=1 to n, j=1 to m) matched with the configuration information number of the configuration change command 281-i (i=1 to n) from the configuration buffer 221-i-j (i=1 to n, j=1 to m) disposed in each configuration control unit 213-i, and sends a rewrite command 262-i-j (i=1 to n, j=1 to m) of an implemented logic designated by configuration information 261-i-j to the reconfigurable processor i 230-i (i=1 to n) matched with the reconfigurable processor number. The reconfigurable processor i 230-i rewrites the implemented logic according to the rewrite command 262-i-j.

The configuration change command 281-i (i=1 to n) may contain the number of writable clocks. In this case, the configuration control unit 213-i (i=1 to n) outputs the rewrite command 262-i-j of the implemented logic after a passage of the number of writable clocks after reception of the command 279 to permit changing of the implemented logic of the reconfiguring-of-logic judgment unit 239.

The reconfigurable apparatus 200 sets information 280 on dividing timing and a dividing range received from the communication unit 201 outside the apparatus in the input data dividing unit 210, sets information 284 on selected data, binding timing, and a binding range received from the communication unit 201 outside the apparatus in the output data binding unit 212, sets information 282-i (i=2 to n) on selected data, binding timing, and a binding range received from the communication unit 201 outside the apparatus in the processed data selection unit 211-i (i=2 to n), and sets information 279 on designated format length and data non-input continuance time received from the communication unit 201 outside the apparatus in the reconfiguring-of-logic judgment unit 239.

The reconfigurable apparatus 200 stores the configuration information 260-i (i=1 to n) received from the communication unit 201 outside the apparatus in the configuration buffer 221-i-j.

In the memory 232-i (i=1 to n) incorporated in the reconfigurable processor i 230-i of the reconfigurable apparatus 200, direct reading/writing is executed with respect to the communication unit 201 outside the apparatus. During reading, a read command 286-i (i=1 to n) containing an address number is transmitted from the communication unit 201 to the memory, and read data 286-i is returned from the memory 232-i. During writing, a write command 286-i containing an address number and write data is transmitted from the communication unit 201 to the memory.

Information transfer between the communication unit 201 and the reconfigurable apparatus 200 is carried out according to a command 285 from the terminal 202 to the communication unit 201.

The reconfigurable apparatus 200 includes the reconfigurable processor i 230-i (i=1 to n) described above, the input data dividing unit 210, the retiming output buffers 223-i, 222, and 224, and the output data binding unit 212. Accordingly, by distributing only the data necessary for computing among the input data to the reconfigurable processor while not distributing the data when data unnecessary for computing is being input, the means for changing the implemented logic of the reconfigurable processor is realized by using the non-computing time generated in the reconfigurable processor. Hence, it is possible to realize the reconfigurable apparatus for enabling logic changing without any loss of input data and without any deterioration of data computing processing performance, which is impossible with the conventional reconfigurable processor or apparatus.

The reconfigurable apparatus 200 includes the processed data selection unit i 211-i and the retiming selection buffers 290-i-j and 291-i. Hence, the plurality of reconfigurable processors can be connected in series or in parallel.

The reconfigurable apparatus 200 includes the configuration control unit 213-i (i=1 to n) described above and the configuration buffer 221-i-j (i=1 to n, j=1 to m). Hence, it is possible to implement a logic designated by configuration information prestored in the configuration buffer in each configurable processor.

Further, the reconfigurable apparatus 200 includes the memory 232-i (i=1 to n). Hence, it is possible to directly read/write data with respect to the memory within the apparatus from the outside of the apparatus.

Third Embodiment

Figure 6:
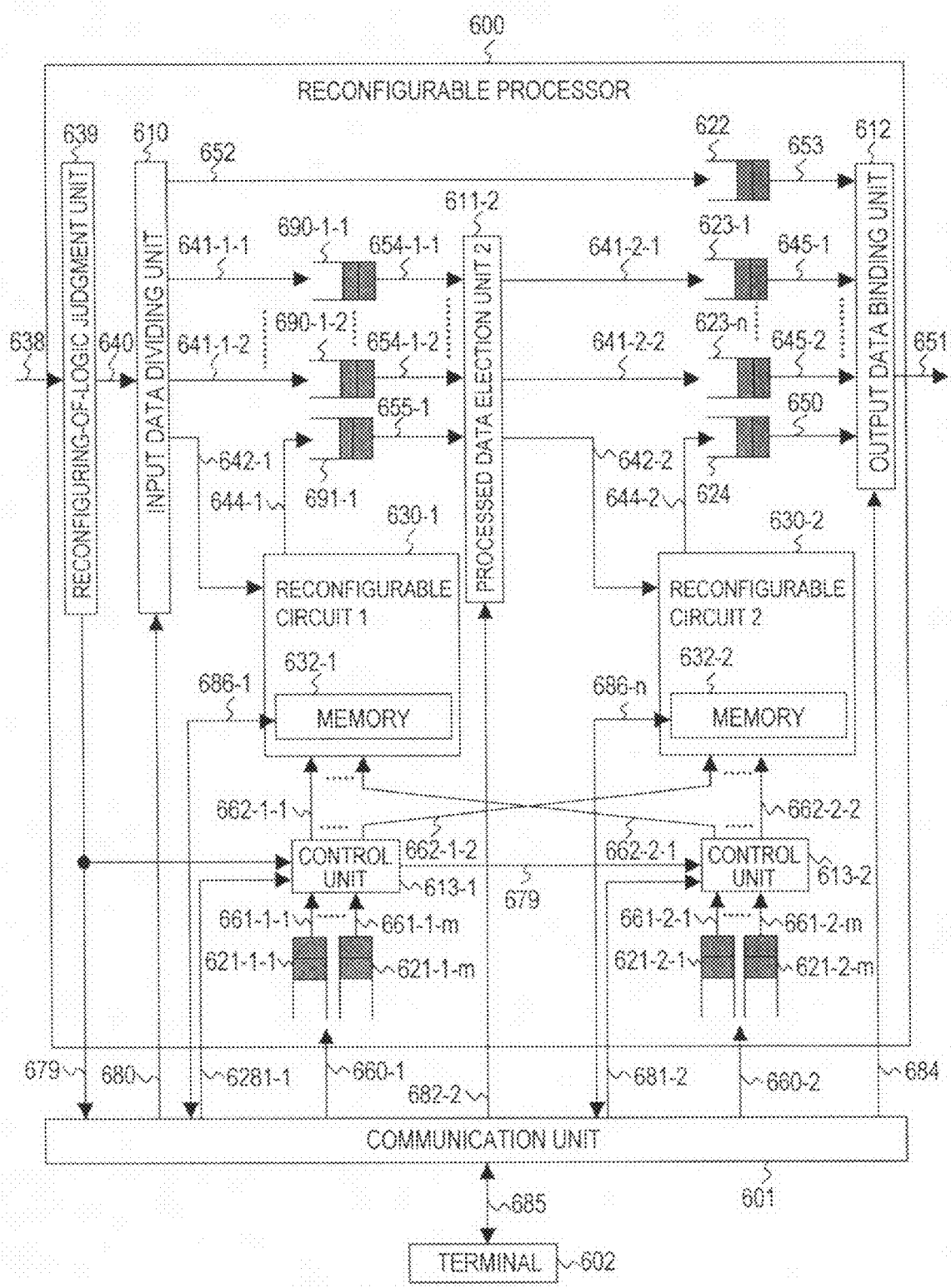
FIG. 6 is a block diagram showing a reconfigurable processor equipped with two reconfigurable circuits according to a third embodiment of this invention.
Figure 8:
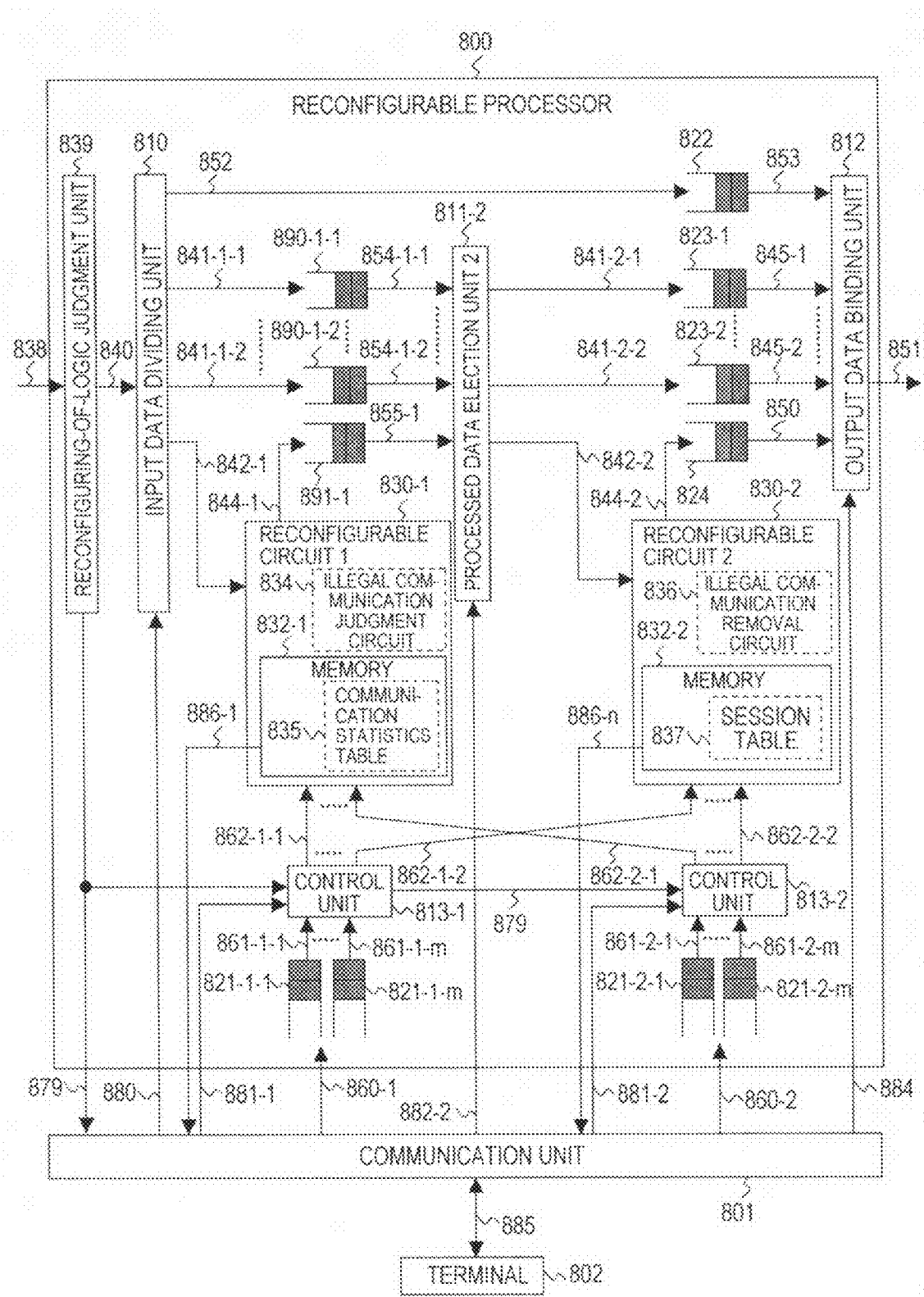
FIG. 8 is a block diagram showing the reconfigurable processor equipped with an illegal communication defense function according to the third embodiment of this invention.

Referring to FIGS. 6 and 8, an operation of this invention will be described in detail.

FIG. 6 is a block diagram of a reconfigurable processor 600 when n=2 is set in the reconfigurable processor 100 of FIG. 1.

A block indicated by reference numerals of 600's of FIG. 6 has the same function as that of a block indicated by reference numerals of 100's of FIG. 1.

FIG. 8 is a block diagram when the reconfigurable processor 600 of FIG. 6 is used as an illegal communication defense reconfigurable processor 800 in a network. An illegal communication judgment circuit 834 for judging an abnormality type for each packet is implemented in a first reconfigurable circuit 1 830-1, and a communication statistics table 835 is implemented in an incorporated memory 832-1. An illegal communication removal circuit 836 for judging passing/discarding of each packet based on a judging result of the abnormality type is implemented in a second reconfigurable circuit 2 830-2. A session table 837 is implemented in an incorporated memory 832-2.

FIGS. 6 and 8 will be described in detail below.

The reconfigurable processor 600 of FIG. 6 divides input data 640 in an input data dividing unit 610. When the input data dividing unit 610 is set to output divided data 642-1 to a reconfigurable circuit 1 630-1 and divided data 641-1-i (i=1, 2) to a processed data selection unit 611-2, and the processed data selection unit 611-2 is set to output input data 654-1-i (i=1, 2) as selected data 642-2 and input data 655-1 as selected data 641-2-i (i=1, 2), the two reconfigurable circuits are connected in parallel. On the other hand, when the input data dividing unit 610 is set to output only the divided data 642-1 to the reconfigurable circuit 1 630-1, and the processed data selection unit 611-2 is set to output the input data 655-1 as selected data 642-2, the two reconfigurable circuits are connected in series.

The illegal communication defense reconfigurable processor 800 of FIG. 8 is a processor obtained by including an illegal communication defense function in the reconfigurable processor 600 of FIG. 6. The illegal communication defense function analyzes packets flowing through a communication network to detect and remove excessive load communications such as peer to peer (P2P) which causes communication faults, or various abnormal communications such as illegal communications executed to attack a personal computer (PC), a router, or a server, e.g., Worm, denial of service (DoS), or distributed denial of service (DDoS). A reconfiguring-of-logic judgment unit 839 judges a packet length as a format length when used for the network. A packet length of an IP header field in the received packet is read to be compared with a predesignated packet length. For example, presuming that a predesignated packet length is 1000 bytes, when a packet whose length is equal to or more than 1000 bytes arrives, a command 879 for changing an implemented logic of the reconfigurable processor is output.

Upon reception of packet data flowing through the network as data 840, the input data dividing unit 810 outputs a part of the packet data as divided data 842-1 to the first reconfigurable circuit 1 830-1. The input data dividing unit 810 also outputs a part of the packet data as divided data 841-1-1 to a processed data selection unit 811-2, and all pieces of packet data as divided data 852 to an output data binding unit 812.

For example, the divided data 842-1 output to the first reconfigurable circuit 1 830-1 contains information such as a transmission source IP address, a destination IP address, a transmission source port number, a destination port number, a TCP flag number, a protocol number, or a packet length described in an IP header or a TCP/UDP header inside a packet. The divided data 841-1-1 output to the processed data selection unit 811-2 contains information such as the transmission source IP address, the destination IP address, the transmission source port number, the destination port number, the TCP flag number, the protocol number, the packet length, a sequence number, or an ACK number described in the IP header or the TCP/UDP header inside the packet.

The illegal communication judgment circuit 834 implemented in the first reconfigurable circuit 1 830-1 analyzes a part of packet data output from the input data dividing unit 810, and stores an analyzing result as communication statistics information in the communication statistics table 835 built in the memory 832-1. The communication statistics information stored in the communication statistics table 835 contains a communication definition such as a transmission source IP address, a destination IP address, a transmission source port number, a destination port number, or a TCP flag number, a packet integrated number matched with the communication definition, and the like.

The illegal communication judgment circuit 834 judges whether a received packet is normal/abnormal based on the communication statistics information stored in the communication statistics table 835. If the packet is judged to be abnormal, a type of the abnormality is judged. Results of judging normality/abnormality and an abnormality type are output as computing result data 844-1 to the processed data selection unit 811-2.

The processed data selection unit 811-2 outputs a part of the received packet data and the judging results of normality/abnormality and the abnormality type as selected data 842-2 to the second reconfigurable circuit 2 830-2.

The illegal communication removal circuit 836 implemented in the second reconfigurable circuit 2 830-2 analyzes a part of the packet data output from the processed data selection unit 811-2 according to the judging results of the normality/abnormality and the abnormality type output from the processed data selection unit 811-2, and stores an analyzing result as session information in the session table 837 built in the memory 832-2. The session information stored in the session table 837 contains a communication definition such as a transmission source IP address, a destination IP address, a transmission source port number, or a destination port number, a packet integrated number matched with the communication definition, presence/absence of a connection requested packet, presence/absence of a response requested packet, presence/absence of a response packet, and the like.

The illegal communication removal circuit 836 judges whether all pieces of the received packet data are to be passed/discarded based on the session information stored in the session table 837. A passing/discarding judging result is output as computing result data 844-2.

The output data binding unit 812 outputs all pieces of the packet data received from the input data dividing unit 810 only when the received computing result data 844-2 has a bit sequence expected when a judging result indicates that the packet data is to be passed. Accordingly, when it is judged that the packet data is to be discarded, outputting of the packet data is stopped.

The illegal communication defense reconfigurable processor 800 is realized by including the reconfigurable circuit 1 830-1 having the illegal communication judgment circuit 834 and the reconfigurable circuit 2 830-2 having the illegal communication removal circuit 836. The illegal communication judgment circuit 834 implemented in the reconfigurable circuit 1 830-1 and the illegal communication removal circuit 836 implemented in the reconfigurable circuit 2 830-2 can minimize and separately receive data necessary for computing. Thus, for example, when time from a reception start of a 1500 byte-length packet to an end is 150 clocks, time from a reception start of data (20 bytes of 1500 bytes) needed by the illegal communication judgment circuit to an end is 2 clocks, and circuit passing time from inputting of data to outputting of a judging result is 100 clocks, non-computing time of 48 clocks is generated in the reconfigurable circuit 1. By using such the non-computing time generated during long packet inputting to update an algorithm implemented in the reconfigurable circuit 1, it is possible to realize uninterruptible algorithm updating without any throughput deterioration.

Fourth Embodiment

Figure 7:
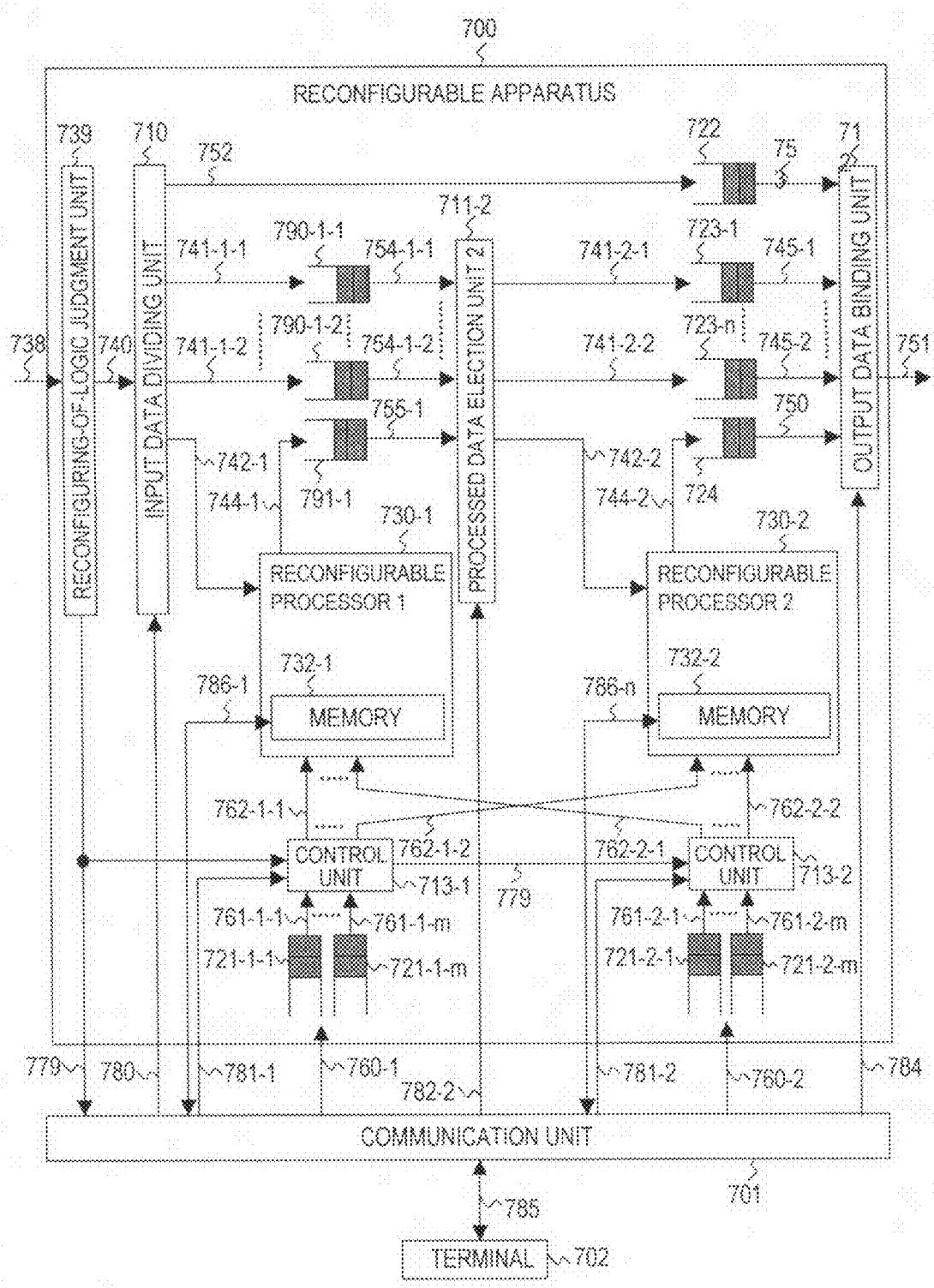
FIG. 7 is a block diagram showing a reconfigurable apparatus equipped with two reconfigurable processors according to a fourth embodiment of this invention.
Figure 9:
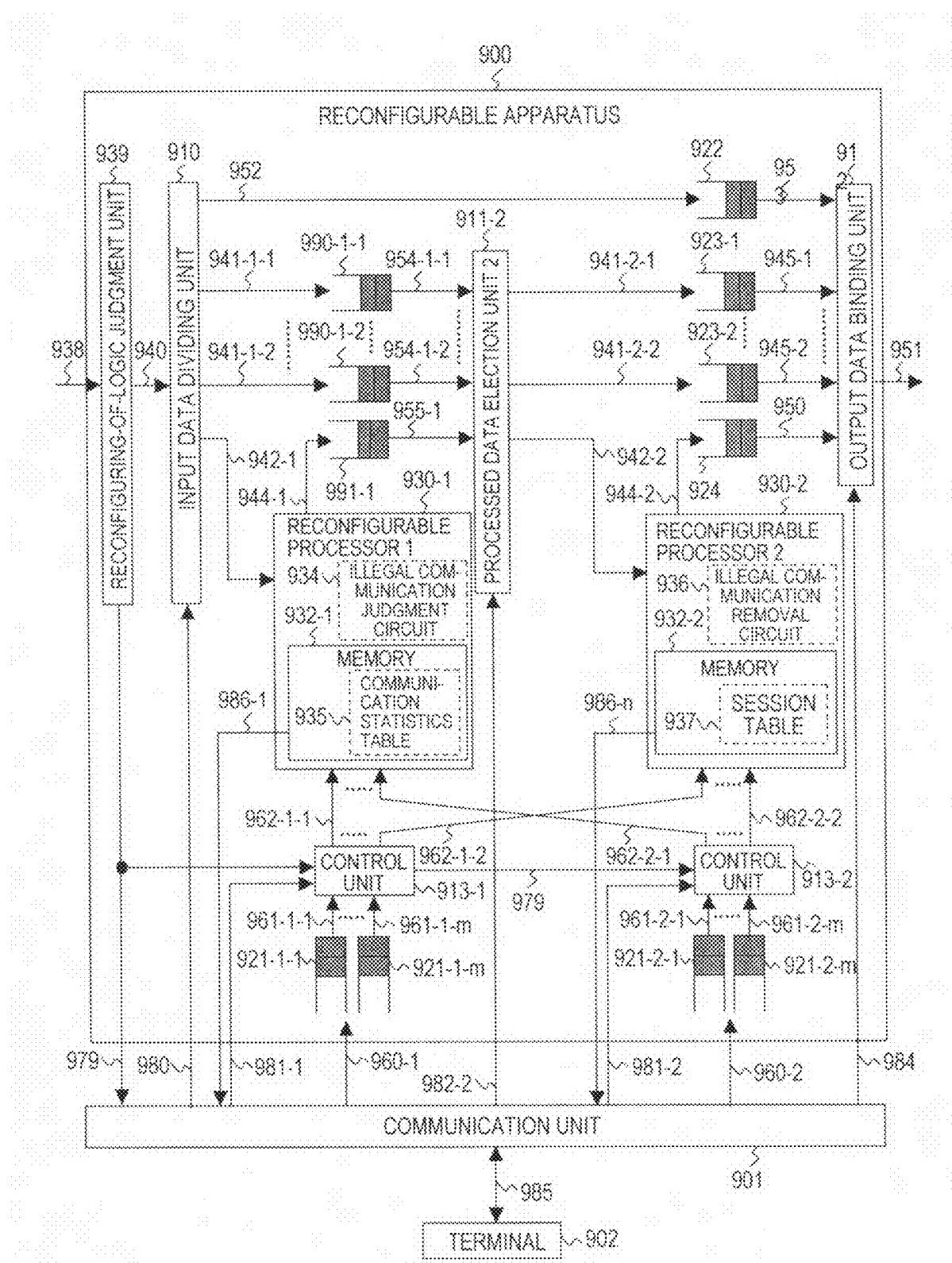
FIG. 9 is a block diagram showing the reconfigurable apparatus equipped with an illegal communication defense function according to the fourth embodiment of this invention.

Referring to FIGS. 7 and 9, an operation of this invention will be described in detail.

FIG. 7 is a block diagram of a reconfigurable apparatus 700 when n=2 is set in the reconfigurable apparatus 200 of FIG. 2. A block indicated by reference numerals of 700's of FIG. 7 has the same function as that of a block indicated by reference numerals of 200's of FIG. 2.

FIG. 9 is a block diagram showing a case where the reconfigurable apparatus 700 of FIG. 7 is used as an illegal communication defense reconfigurable apparatus 900. An illegal communication judgment circuit 934 for judging an abnormality type for each packet is implemented in a first reconfigurable processor 1 930-1, and a communication statistics table 935 is implemented in an incorporated memory 932-1. An illegal communication removal circuit 936 for judging passing/discarding of each packet based on a judging result of the abnormality type is implemented in a second reconfigurable processor 2 930-2. A session table 937 is implemented in an incorporated memory 932-2.

FIGS. 7 and 9 will be described in detail below.

The reconfigurable apparatus 700 of FIG. 7 divides input data 740 in an input data dividing unit 710. When the input data dividing unit 710 is set to output divided data 742-1 to a reconfigurable processor 1 730-1 and divided data 741-1–i (i=1, 2) to a processed data selection unit 711-2, and the processed data selection unit 711-2 is set to output input data 754-1–i(i=1, 2) as selected data 742-2 and input data 755-1 as selected data 741-2-i(i=1, 2), the two reconfigurable processors are connected in parallel. On the other hand, when the input data dividing unit 710 is set to output only the divided data 742-1 to the reconfigurable processor 1 730-1, and the processed data selection unit 711-2 is set to output the input data 755-1 as selected data 742-2, the two reconfigurable processors are connected in series.

The illegal communication defense reconfigurable apparatus 900 of FIG. 9 is an apparatus obtained by including an illegal communication defense function in the reconfigurable apparatus 700 of FIG. 7.

A reconfiguring-of-logic judgment unit 939 judges a packet length as a format length when used for a network. A packet length of an IP header field in the received packet is read to be compared with a predesignated packet length. For example, presuming that a predesignated packet length is 1000 bytes, when a packet whose length is equal to or more than 1000 bytes arrives, a command 979 for changing an implemented logic of the reconfigurable processor is output.

Upon reception of packet data flowing through the network as data 940, the input data dividing unit 910 outputs a part of the packet data as divided data 942-1 to the first reconfigurable processor 1 930-1. The input data dividing unit 910 also outputs a part of the packet data as divided data 941-1-1 to a processed data selection unit 911-2, and all pieces of packet data as divided data 952 to an output data binding unit 912.

The divided data 942-1 output to the first reconfigurable processor 1 930-1 contains, for example, information such as a transmission source IP address, a destination IP address, a transmission source port number, a destination port number, a TCP flag number, a protocol number, or a packet length described in an IP header or a TCP/UDP header inside a packet. The divided data 941-1-1 output to the processed data selection unit 911-2 contains information such as the transmission source IP address, the destination IP address, the transmission source port number, the destination port number, the TCP flag number, the protocol number, the packet length, a sequence number, or an ACK number described in the IP header or the TCP/UDP header inside the packet.

The illegal communication judgment circuit 934 implemented in the first reconfigurable processor 1 930-1 analyzes a part of packet data output from the input data dividing unit 910, and stores an analyzing result as communication statistics information in a communication statistics table 935 built in the memory 932-1. The communication statistics information stored in the communication statistics table 935 contains a communication definition such as a transmission source IP address, a destination IP address, a transmission source port number, a destination port number, or a TCP flag number, a packet integrated number matched with the communication definition, and the like.

The illegal communication judgment circuit 934 judges whether a received packet is normal/abnormal based on the communication statistics information stored in the communication statistics table 935. If the packet is judged to be abnormal, a type of the abnormality is judged. Results of judging normality/abnormality and an abnormality type are output as computing result data 944-1 to the processed data selection unit 911-2.

The processed data selection unit 911-2 outputs a part of the received packet data and the judging results of normality/abnormality and the abnormality type as selected data 942-2 to the second reconfigurable processor 2 930-2.

The illegal communication removal circuit 936 implemented in the second reconfigurable processor 2 930-2 analyzes a part of the packet data output from the processed data selection unit 911-2 according to the judging results of the normality/abnormality and the abnormality type output from the processed data selection unit 911-2, and stores an analyzing result as session information in a session table 937 built in the memory 932-2. The session information stored in the session table 937 contains a communication definition such as a transmission source IP address, a destination IP address, a transmission source port number, or a destination port number, a packet integrated number matched with the communication definition, presence/absence of a connection requested packet, presence/absence of a response requested packet, presence/absence of a response packet, and the like.

The illegal communication removal circuit 936 judges whether all the pieces of received packet data are to be passed/discarded based on the session information stored in the session table 937. A passing/discarding judging result is output as computing result data 944-2.

The output data binding unit 912 outputs all pieces of the packet data received from the input data dividing unit 910 only when the received computing result data 944-2 has a bit sequence expected when a judging result indicates that the packet data is to be passed. Accordingly, when it is judged that the packet data is to be discarded, outputting of the packet data is stopped.

The illegal communication defense reconfigurable apparatus 900 is realized by including the reconfigurable processor 1 930-1 having the illegal communication judgment circuit 934 and the reconfigurable processor 2 930-2 having the illegal communication removal circuit 936 as described above. The illegal communication judgment circuit 934 implemented in the reconfigurable processor 1 930-1 and the illegal communication removal circuit 936 implemented in the reconfigurable processor 2 930-2 can minimize and separately receive data necessary for computing. Thus, for example, when time from a reception start of a 1500 byte-length packet to an end is 150 clocks, time from a reception start of data (20 bytes of 1500 bytes) needed by the illegal communication judgment circuit to an end is 2 clocks, and circuit passing time from inputting of data to outputting of a judging result is 100 clocks, non-computing time of 48 clocks is generated in the reconfigurable circuit 1. By using such the non-computing time generated during long packet inputting to update an algorithm implemented in the reconfigurable circuit 1, it is possible to realize uninterruptible algorithm updating without any throughput deterioration.

Fifth Embodiment

FIGS. 10 to 13 each show an example where a reconfigurable processor implemented unit including the illegal communication defense reconfigurable processor 800 or the illegal communication defense reconfigurable apparatus 900 of this invention is used for communication.

Figure 10:
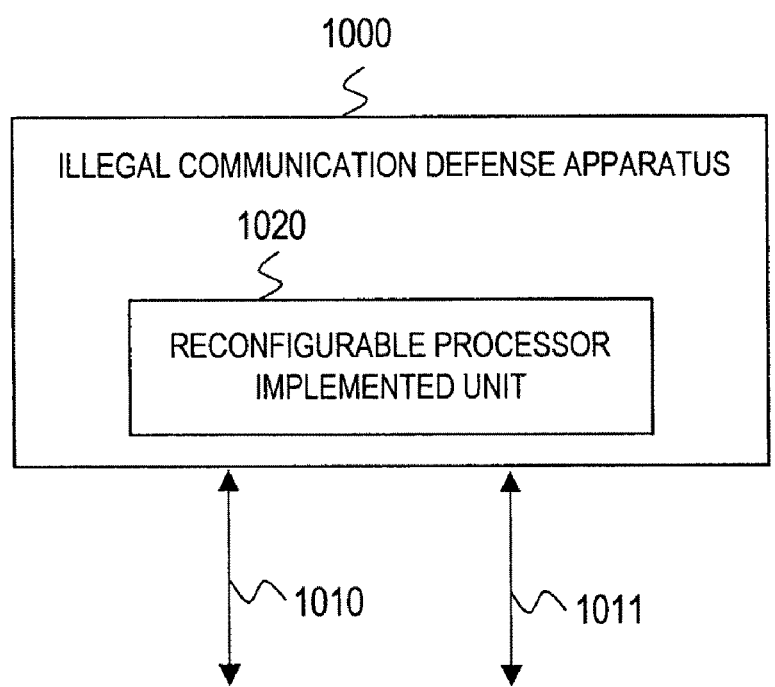
FIG. 10 is a block diagram showing an illegal communication defense apparatus equipped with a reconfigurable processor implemented unit for executing illegal communication defense processing according to a fifth embodiment of this invention.

FIG. 10 is a block diagram showing an illegal communication defense apparatus 1000 which includes the illegal communication defense reconfigurable processor 800 or the illegal communication defense reconfigurable apparatus 900 in a reconfigurable processor implemented unit 1020, and two communication data input/output units 1010 and 1011.

Figure 11:
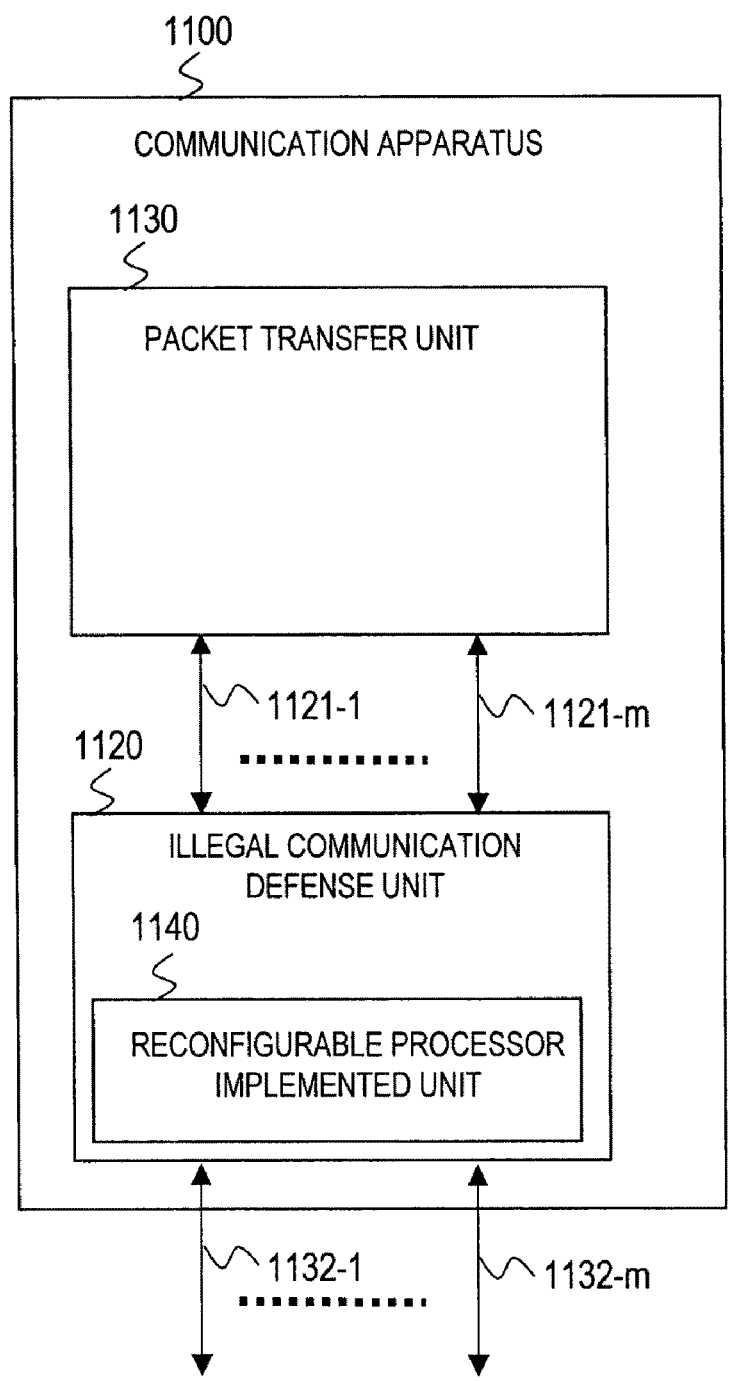
FIG. 11 is a block diagram showing a communication apparatus equipped with a reconfigurable processor implemented unit for executing illegal communication defense processing and a packet transfer unit according to the fifth embodiment of this invention.

FIG. 11 is a block diagram showing a communication apparatus 1100 which includes the illegal communication defense reconfigurable processor 800 or the illegal communication defense reconfigurable apparatus 900 in a reconfigurable processor implemented unit 1140, an illegal communication defense unit 1120 including the reconfigurable processor implemented unit 1140, a packet transfer unit 1130, and a communication data input/output unit 1132-k (k=1 to m).

Figure 12:
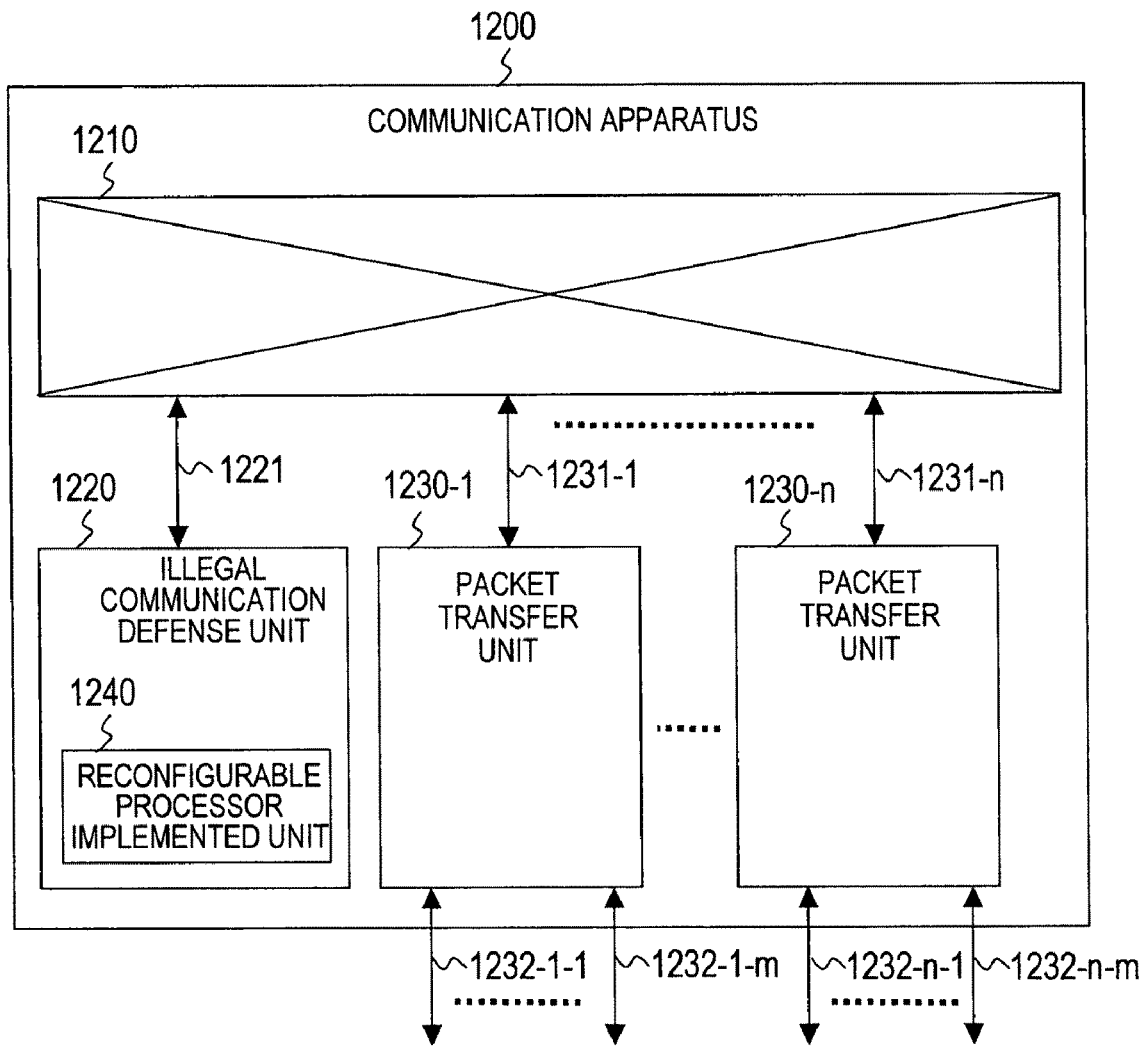
FIG. 12 is a block diagram showing the communication apparatus equipped with the reconfigurable processor implemented unit for executing the illegal communication defense processing, the packet transfer unit, and a switching unit according to the fifth embodiment of this invention.

FIG. 12 is a block diagram showing a communication apparatus 1200 which includes the illegal communication defense reconfigurable processor 800 or the illegal communication defense reconfigurable apparatus 900 in a reconfigurable processor implemented unit 1240, an illegal communication defense unit 1220 including the reconfigurable processor implemented unit 1240, a switching unit 1210, a packet transfer unit 1230-i (i=1 to n), and a communication data input/output unit 1232-i–k (i=1 to n, k=1 to m).

Figure 13:
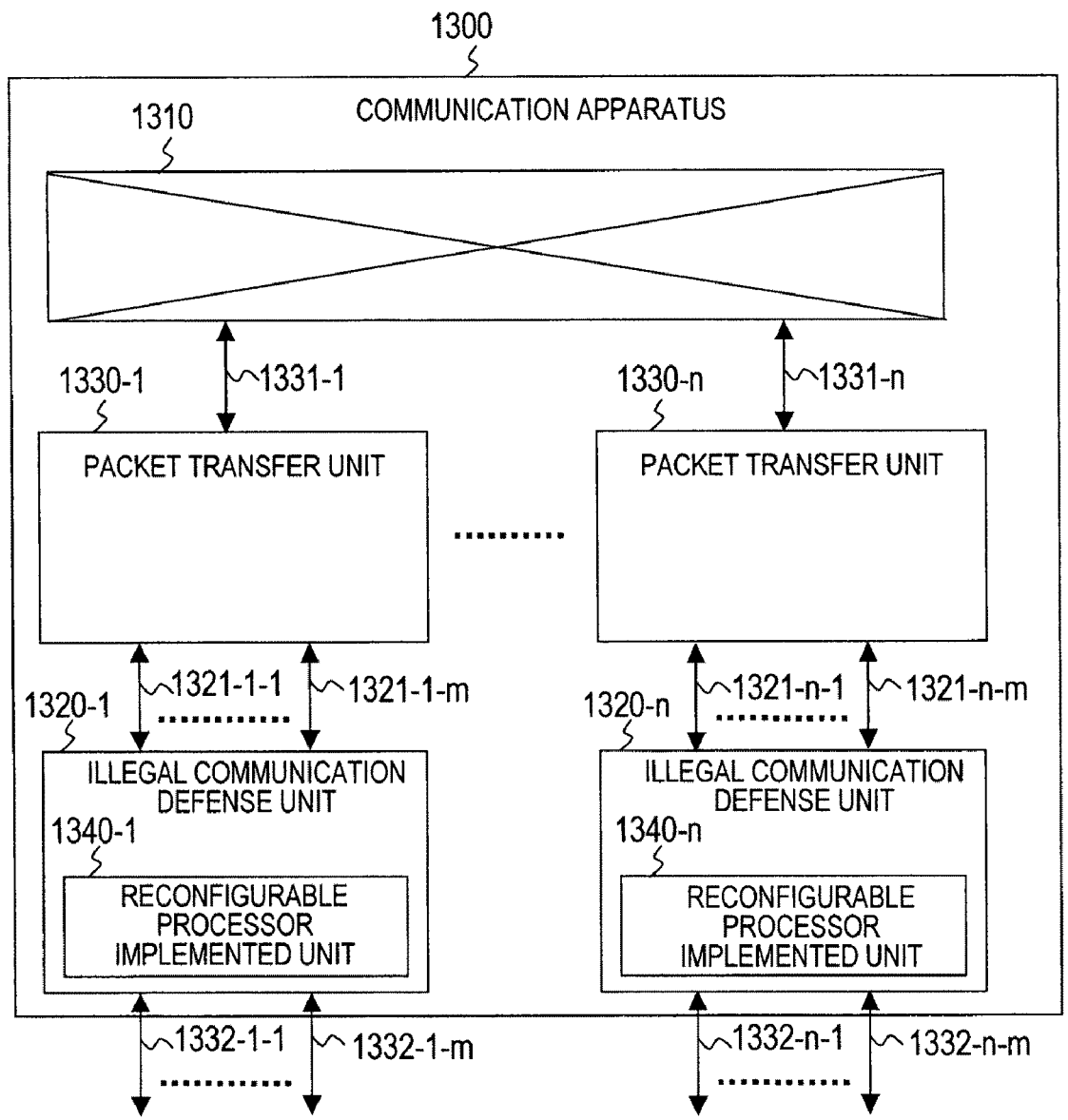
FIG. 13 is a block diagram showing the communication apparatus equipped with the reconfigurable processor implemented unit for executing the illegal communication defense processing for each of the packet transfer units, and the switching unit according to the fifth embodiment of this invention.

FIG. 13 is a block diagram showing a communication apparatus 1300 which includes the illegal communication defense reconfigurable processor 800 or the illegal communication defense reconfigurable apparatus 900 in a reconfigurable processor implemented unit 1340-i (i=1 to n), an illegal communication defense unit 1320-i (i=1 to n) including the reconfigurable processor implemented unit 1340-i, a switching unit 1310, a packet transfer unit 1330-i (i=1 to n), and a communication data input/output unit 1332-i–k (i=1 to n, k=1 to m).

FIGS. 10 to 13 will be described below in detail.

The illegal communication defense apparatus 1000 of FIG. 10 includes the two communication data input/output units 1010 and 1011. Packet data input from each of the communication data input/output units 1010 and 1011 is subjected to illegal communication defense processing at the reconfigurable processor implemented unit 1020, and the processed packet data is output from the other one of the communication data input/output units 1010 and 1011.

The communication apparatus 1100 of FIG. 11 includes one or more communication data input/output units 1132-k (k=1 to m). Packet data input from each communication data input/output unit 1132-k is subjected to illegal communication defense processing at the reconfigurable processor implemented unit 1140 in the illegal communication defense unit 1120, and the processed packet data is output through a communication data internal input/output unit 1121-k (k=1 to m) to the packet transfer unit 1130. The packet transfer unit 1130 transmits the received packet data to the communication data internal input/output unit 1121-k set according to a destination IP address, a destination MAC address, a destination MPLS label number, or a destination VLAN number of the received packet data. The illegal communication defense unit 1120 outputs the packet received via the communication data internal input/output unit 1121-k to the communication data input/output unit 1132-k.

The communication apparatus 1200 of FIG. 12 includes a communication data input/output unit 1132-i–k (i=1 to n, k=1 to m) for each packet transfer unit 1230-i (i=1 to n). Packet data input from each communication data input/output unit 1232-i–k to the packet transfer unit 1230-i is output to the communication data input/output unit 1232-i–k of the input destination packet transfer unit 1230-i according to a destination IP address, a destination MAC address, a destination MPLS label number, or a destination VLAN number of the packet data, or output to the other packet transfer unit 1230-i or the illegal communication defense unit 1220 via the communication data internal input/output unit 1231-i (i=1 to n) and a switching unit 1210. The packet data output to the illegal communication defense unit 1220 is subjected to illegal communication defense processing at the reconfigurable processor implemented unit 1240 in the illegal communication defense unit 1220, and the processed packet data is output to the other packet transfer unit 1230-i via the communication data internal input/output unit 1221 and the switching unit 1210 according to the destination IP address, the destination MAC address, the destination MPLS label number, or the destination VLAN number of the packet data. The packet transfer unit 1230-i outputs the received packet data to the communication data input/output unit 1232-i–k set according to the destination IP address, the destination MAC address, the destination MPLS label number, or the destination VLAN number of the packet data received from the switching unit 1210.

The communication apparatus 1300 of FIG. 13 includes a communication data input/output unit 1332-i–k (i=1 to n, k=1 to m) for each illegal communication defense unit 1320-i (i=1 to n). Packet data input from each communication data input/output unit 1332-i–k is subjected to illegal communication defense processing at the reconfigurable processor implemented unit 1340-i in the illegal communication defense unit 1320-i. The processed packet data is output through the communication data internal input/output unit 1321-i–k (i=1 to n, k=1 to m) to the packet transfer unit 1330-i (i=1 to n). The packet data output to the packet transfer unit 1330-i is output to the communication data internal input/output unit 1321-i–k connected to the input destination packet transfer unit 1330-i according to a destination IP address, a destination MAC address, a destination MPLS label number, or a destination VLAN number of the packet data, or output to the other packet transfer unit 1330-i via the communication data internal input/output unit 1331-i (i=1 to n) and a switching unit 1310. The packet transfer unit 1330-i transmits the received packet data to the communication data internal input/output unit 1321-i–k set according to the destination IP address, the destination MAC address, the destination MPLS label number, or the destination VLAN number of the packet data received from the switching unit 1310. The illegal communication defense unit 1320-i outputs the packet data received via the communication data internal input/output unit 1321-i–k to the communication data input/output unit 1332-i–k.

While the present invention has been described in detail and pictorially in the accompanying drawings, the present invention is not limited to such detail but covers various obvious modifications and equivalent arrangements, which fall within the purview of the appended claims.

What is claimed is:

1. A reconfigurable processor equipped with a plurality of reconfigurable circuits capable of implementing optional logics, comprising:
    an input data dividing unit for dividing data input to the processor to generate a plurality of pieces of divided data, and outputting a part of the plurality of pieces of divided data to one of the reconfigurable circuits;
    a processed data selection unit for selecting or binding at least one piece of divided data among divided data which is not outputted to the one of the reconfigurable circuit from the input data dividing unit and output data of the one of the reconfigurable circuits to output processed data to other reconfigurable circuits;
    at least one retiming selection buffer for temporarily storing data to be input to the processed data selection unit to match a timing of outputting to the processed data selection unit the output data of the one of the reconfigurable circuits and a timing of outputting to the processed data selection unit first output data of the input data dividing unit to the retiming selection buffer;
    an output data binding unit for binding output data of said other reconfigurable circuits, second output data of the input data dividing unit, and output data of the processed data selection unit to output the bound output data to an outside of the processor, the second output data not being processed by the processed data selection unit; and
    at least one retiming output buffer for temporarily storing data to be input to the output data binding unit to match a timing of outputting to the output data binding unit the output data of said other reconfigurable circuits, a timing of outputting to the output data binding unit the second output data of the input data dividing unit, and a timing of outputting to the output data binding unit the output data of the processed data selection unit,
    wherein the plurality of reconfigurable circuits are interconnected in one of series and parallel.

2. A reconfigurable apparatus equipped with a plurality of reconfigurable processors capable of implementing optional logics, comprising:
    an input data dividing unit for dividing data input to the apparatus to generate a plurality of pieces of divided data, and outputting a part of the plurality of pieces of divided data to one of the reconfigurable processors;
    a processed data selection unit for selecting or binding at least one piece of divided data among divided data which is not outputted to the one of the reconfigurable circuits and output data of the one of the reconfigurable processors to output processed data to other reconfigurable processors;
    at least one retiming selection buffer for temporarily storing data input to the processed data selection unit to match a timing of outputting to the processed data selection unit the output data of the one of the reconfigurable processors and a timing of outputting to the processed data selection unit first output data of the input data dividing unit to the retiming selection buffer;
    an output data binding unit for binding output data of said other reconfigurable processors, second output data of the input data dividing unit, and output data of the processed data selection unit to output the bound output data to an outside of the apparatus, the second output data not being processed by the processed data selection unit; and
    at least one retiming output buffer for temporarily storing data to be input to the output data binding unit to match a timing of outputting to the output data binding unit the output data of said other reconfigurable processors, a timing of outputting to the output data binding unit the second output data of the input data dividing unit, and a timing of outputting to the output data binding unit the output data of the processed data selection unit,
    wherein the plurality of reconfigurable processors are interconnected in one of series and parallel.

* * * * *